United States Patent
Shin et al.

(10) Patent No.: US 9,526,122 B2
(45) Date of Patent: Dec. 20, 2016

(54) METHODS FOR UNIQUELY IDENTIFYING COMMUNICATION LINKS BETWEEN COMMUNICATION DEVICES

(71) Applicant: Electronics and Telecommunications Research Institute, Daejeon (KR)

(72) Inventors: Wooram Shin, Daejeon (KR); Eunkyung Kim, Daejeon (KR); Anseok Lee, Daejeon (KR); Jae Sun Cha, Daejeon (KR); Kwang Jae Lim, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 231 days.

(21) Appl. No.: 13/940,711

(22) Filed: Jul. 12, 2013

(65) Prior Publication Data

US 2014/0016551 A1 Jan. 16, 2014

(30) Foreign Application Priority Data

Jul. 13, 2012 (KR) .................. 10-2012-0076753
Jul. 16, 2012 (KR) .................. 10-2012-0077185
Jul. 18, 2012 (KR) .................. 10-2012-0078420
Sep. 14, 2012 (KR) .................. 10-2012-0102403
Jul. 10, 2013 (KR) .................. 10-2013-0081175

(51) Int. Cl.
*H04W 76/02* (2009.01)
*H04W 88/08* (2009.01)

(52) U.S. Cl.
CPC ......... *H04W 76/021* (2013.01); *H04W 76/023* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,891,833 B1 * | 5/2005 | Caves et al. ............... | 370/395.2 |
| 2001/0017856 A1 * | 8/2001 | Asokan et al. .............. | 370/389 |
| 2009/0016219 A1 * | 1/2009 | Laroia .................. | H04W 72/02 370/231 |
| 2009/0016295 A1 * | 1/2009 | Li ......................... | H04L 5/0007 370/330 |
| 2009/0232086 A1 * | 9/2009 | Li ...................... | H04W 76/021 370/330 |
| 2011/0038312 A1 * | 2/2011 | Wang et al. .................. | 370/328 |
| 2011/0116466 A1 * | 5/2011 | Chang et al. ................ | 370/329 |
| 2012/0147745 A1 * | 6/2012 | Wang et al. .................. | 370/235 |
| 2013/0064187 A1 * | 3/2013 | Patil et al. .................... | 370/329 |
| 2013/0195026 A1 * | 8/2013 | Johnsson et al. ............. | 370/329 |

(Continued)

*Primary Examiner* — Benjamin Lamont
(74) *Attorney, Agent, or Firm* — Rabin & Berdo, P.C.

(57) ABSTRACT

A communication method for a third device that controls a first link established directly between a first device and a second device is provided. The third device allocates a first link identifier for identifying the first link. The third device transmits first information including the first link identifier to the first device and the second device. The third device receives, from the first device and the second device, second information including allocation acceptance information indicating the acceptance or rejection of allocation of the first link identifier.

16 Claims, 5 Drawing Sheets

(56) References Cited

U.S. PATENT DOCUMENTS

2013/0215836 A1* 8/2013 Quan et al. .................... 370/329
2013/0295976 A1* 11/2013 Patil et al. .................... 455/501
2014/0057670 A1* 2/2014 Lim et al. ..................... 455/509
2015/0056983 A1* 2/2015 Cho et al. .................. 455/426.1
2015/0105113 A1* 4/2015 Lee et al. ...................... 455/500

* cited by examiner

METHODS FOR UNIQUELY IDENTIFYING COMMUNICATION LINKS BETWEEN COMMUNICATION DEVICES

CROSS-REFERENCE TO RELATED APPLICATION

This application claims priority to and the benefit of Korean Patent Application No. 10-2012-0076753, 10-2012-0077185, 10-2012-0078420, 10-2012-0102403, and 10-2013-0081175 filed in the Korean Intellectual Property Office on Jul. 13, 2012, Jul. 16, 2012, Jul. 18, 2012, Sep. 14, 2012, and Jul. 10, 2013, the entire contents of which are incorporated herein by reference.

BACKGROUND OF THE INVENTION (a) Field of the Invention

The present invention relates to a communication method and a method and apparatus for identifying communication links.

(b) Description of the Related Art

Communication links are required in order for a communication device to communicate with another communication devices. If there are multiple communication devices, multiple communication links may be present. A variety of methods are used to distinguish multiple communication links. In a cellular network, a communication link exists only between a base station (or relay station) and a terminal, and a terminal identifier is used to identify the communication link. In a MESH or AD-HOC network, each communication device performs communication with multiple adjacent communication devices. Thus, identifiers of transmission and reception devices are used to identify communication links. Recently, the cellular network standard (IEEE 802.16.1a) has provided direct communications between terminals. Unique addresses of a transmitting terminal and a receiving terminal are used to identify links in direct communication, which applies only to direct communications between terminals within the same cell.

Link identification information may be included in control information or data information. Accordingly, it is necessary to identify a large number of links with as small an amount of link identification information as possible, in order to reduce the overhead caused by the link identification information.

The use of a terminal identifier for link identification may cause privacy and security problems. Therefore, other types of identification systems are required for link identification.

SUMMARY OF THE INVENTION

The present invention has been made in an effort to provide a method of allocating, changing, and releasing communication link identification information, and a method of using communication link identification information during communication.

An exemplary embodiment of the present invention provides a communication method for a third device that controls a first link established directly between a first device and a second device. The communication method includes: allocating a first link identifier for identifying the first link; transmitting first information including the first link identifier to the first device and the second device; and receiving, from the first device and the second device, second information including allocation acceptance information indicating the acceptance or rejection of allocation of the first link identifier.

The third device may be either a base station or relay station.

The transmitting of first information includes, in the first information, a first device indicator for identifying the first device of the first link and a second device indicator for identifying the second device of the first link.

The communication method may further include: allocating a second link identifier for identifying a second link formed directly between the first device and a fourth device; and transmitting third information including the second link identifier to the first device and the fourth device. Herein, the transmitting of third information includes including the first device indicator in the third information to identify the first device of the second link.

The transmitting of first information may further include including link information about the first link and period information about a period during which the first link identifier can be used.

The second information may further include link information about the first link and period information about a period during which the first link identifier can be used.

The communication method may further include: if the second information is not received, or even if received, if the allocation acceptance information of the second information indicates the rejection of allocation of the first link identifier, allocating the second link identifier for identifying the first link; and if the second link identifier is allocated, transmitting third information including the second link identifier to the first device and the second device.

The communication method may further include transmitting, to the first device and the second device, third information to change at least either the allocated first link identifier or the period during which the allocated first link identifier can be used.

The communication method may further include transmitting, to the first device and the second device, third information to release the allocated first link identifier.

Another exemplary embodiment of the present invention provides a communication method of a second terminal that forms a first link for direct communication with a first terminal. The communication method includes: receiving, from a base station, first information including a first link identifier allocated by the base station; and transmitting, to the base station, second information including allocation acceptance information indicating the acceptance or rejection of allocation of the first link identifier. Herein, the first link identifier is a link identifier for identifying the first link.

Yet another exemplary embodiment of the present invention provides a method for a first terminal to identify a first link formed directly between the first terminal and a second terminal. The link identification method includes: sending, to at least one third terminal neighboring the first terminal, a request for the transmission of at least one first link identifier allocated to the third terminal; receiving the first link identifier from the third terminal; allocating a second link identifier, different from the first link identifier, to identify the first link; transmitting first information including the second link identifier to the first terminal; and receiving, from the first terminal, second information including allocation acceptance information indicating the acceptance or rejection of allocation of the second link identifier.

A further exemplary embodiment of the present invention provides a communication method for a base station that controls N communication links formed directly between a first terminal and N (N is a natural number) second terminals. The communication method includes: transmitting, to the first terminal, a first message containing N link identifiers for identifying the N communication links; and receiving, from the first terminal, a second message containing N pieces of allocation acceptance information indicating the acceptance or rejection of allocation of the N link identifiers.

DETAILED DESCRIPTION OF THE EMBODIMENTS

Figure 1:
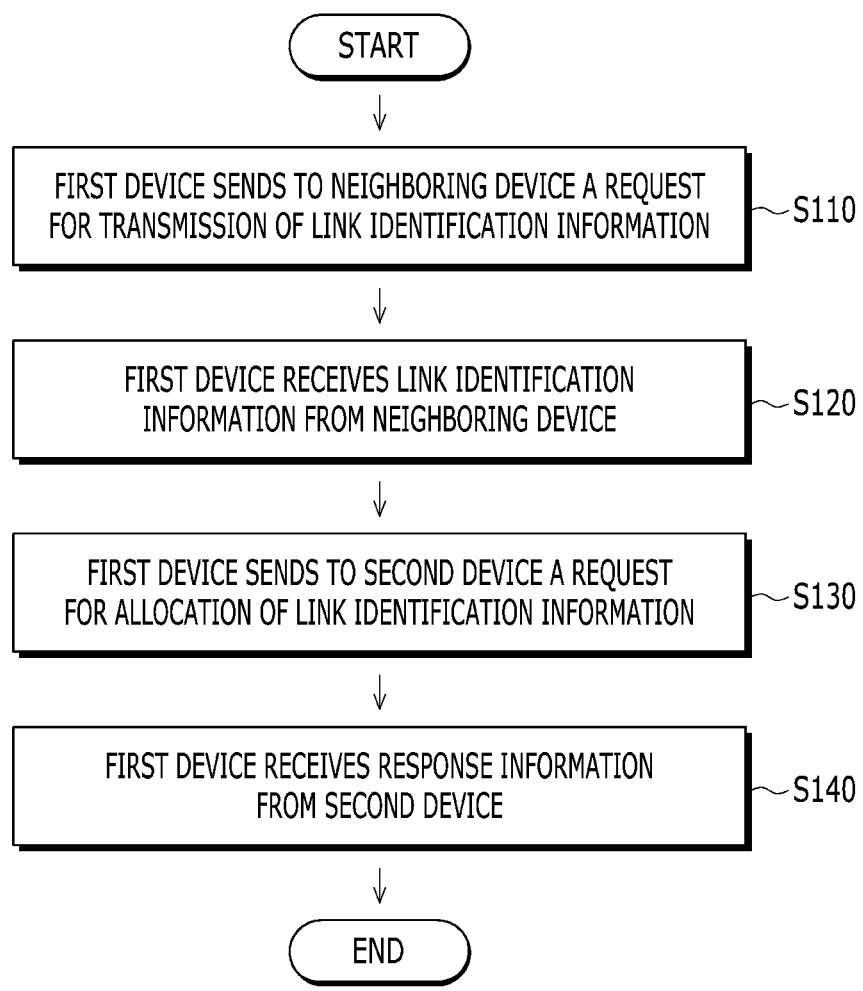
FIG. 1 is a flowchart showing a procedure of dynamically allocating link identification information between devices forming a link in accordance with an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "mobile station (MS)" may designate a mobile station (MS), a mobile terminal (MT), an advanced mobile station (AMS), a high reliability mobile station (HR-MS), a subscriber station (SS), a portable subscriber station (PSS), an access terminal (AT), user equipment (UE), etc., or may include all or some functions of the MT, AMS, HR-MS, SS, PSS, AT, UE, etc.

Further, the term "base station" (BS) may designate an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) serving as a base station, a high reliability relay station (HR-RS) serving as a base station, etc., or may include all or some functions of the ABS, nodeB, eNodeB, AP, RAS, BTS, MMR-BS, RS, HR-RS, etc.

A communication device (hereinafter, device) may establish a communication link (hereinafter, link) with another device. A device in a cellular network or infra-network refers to a base station, a relay station, or a terminal. A device is able to transmit a signal to another device via a link established between the two devices. For example, it is assumed that a link is established between a first device (e.g., a terminal) and a second device (e.g., a terminal). If the first device intends to transmit control information or data to the second device, the first device and the second device can transmit/receive control information required for communication. The information required for communication may be generated by the first device and the second device and exchanged directly between the two devices. If a third device (e.g., a base station) is able to supervise (or control) communications between the first device and the third device, information required for communication may be generated by the third device and be provided to the first device and the second device. The information required for communication may include synchronization-related information, resource allocation-related information, link adaptation-related information (e.g., a modulation order), code rate, power control-related information, and MIMO (multiple-input multiple-output) transmission control-related information. The first device may form links with a plurality of other devices (e.g., terminals) in addition to the second device, and transmit the same signal transmitted to the second device to the other devices besides the second device.

A device may establish a link with each of the multiple devices (e.g., terminals), and communication may occur simultaneously in multiple adjacent links. For example, communication occurs simultaneously in such a manner that the first device transmits a signal to the second device, a fourth device (e.g., a terminal) transmits a signal to a fifth device (e.g., a terminal), a sixth device (e.g., a terminal) transmits a signal to the fifth device, and the second device transmits a signal to a seventh device (e.g., a terminal). As such, links to which a device is not assigned and links to which the device is assigned may co-exist in a communication network, and the device may be assigned to multiple links. Accordingly, each device is required to identify each link for transmission or control.

A specific identifier which has been conventionally used for communication, or a unique link identifier may be used to identify a link.

1. Link Identification without Using Unique Link Identifier

The device identifier of a device that establishes a link may be used for link identification. The device identifier may be a MAC address, a station ID, or a node ID. The device is able to identify a link by using the device identifier of a device that establishes the link.

Moreover, a flow ID (FID) or a connection ID (CID) may be used for link identification. In addition, in the case that the FID or CID has no orientation with uplink/downlink as in a cellular network or infrastructure network, a combination (hereinafter, FID combination) of the FID and an uplink/downlink indicator or a combination (hereinafter, CID combination) of the CID and an uplink/downlink indicator may be used for link identification.

The above-mentioned device identifier, FID, or CID may be used for link identification when a unique link identifier is not used or before a unique link identifier is allocated. Specifically, when transmitting a message (hereinafter, link control message) containing information related to the management or control of a link, a device identifier, FID, CID, FID combination, or CID combination may be used to indicate this link. That is, the link control message may contain a device identifier, FID, CID, FID combination, or CID combination, in order to indicate the corresponding link when transmitting the link control message. If there are multiple links to be controlled, the link control message may contain a plurality of device identifiers, FIDs, CIDs, FID combinations, or CID combinations in order to indicate the respective links. If a source device (e.g., a source terminal) and a destination device (e.g., a destination terminal) in a cellular network or infrastructure network use different FIDs or CIDs, each link control message transmitted to each device may contain an FID, CID, FID combination, or CID combination corresponding to each device.

According to the IEEE 802.16n standard, when creating a link for direct communication between two devices (e.g., two terminals), a base station transmits a DC-LC-REQ message to the two terminals in order to make a request to create a link between the two terminals, and the two terminals each transmit a DC-LC-RSP message in response to the request. The DC-LC-REQ message and/or DC-LC-RSP message may contain the CID of each terminal corresponding to this link. If there are multiple links, the DC-LC-REQ message and/or DC-LC-RSP message may contain the CID of each terminal corresponding to each of the multiple links.

The DC-LC-REQ message may have the format as shown in the following Table 1.

TABLE 1

Format of DC-LC-REQ Message

| Syntax | Size (bits) | Note |
|---|---|---|
| Management Message Type | 8 | 119 |
| N-DC-LINK | 2 | Number of DC links |
| Reserved | 6 | |
| for (i=0; i< N-DC-LINK; i++){ | | |
| CID assigned for transmitting | 16 | |
| CID assigned for receiving | 16 | |
| } | | |

As shown in Table 1, the DC-LC-REQ message may contain Management Message Type (set to 119), number of direct communication links (N-DC-Link), as many transmission CIDs (CIDs assigned for transmitting) as the number of direct communication links, and as many reception CIDs (CIDs assigned for receiving) as the number of direct communication links.

The DC-LC-RSP message may have the format as shown in the following Table 2.

TABLE 2

Format of DC-LC-RSP Message

| Syntax | Size (bits) | Note |
|---|---|---|
| Management Message Type | 8 | 120 |
| N-DC-LINK | 2 | Number of DC links |
| Reserved | 6 | |
| for (i=0; i< N-DC-LINK; i++){ | | |
| CID assigned to DC Link | 16 | CID assigned for transmission |
| Confirmation Code | 1 | 0x00: Accept 0x01: Reject |
| Reserved | 7 | |
| } | | |

As shown in Table 2, the DC-LC-RSP message may contain Management Message Type (set to 120), the number of direct communication links (N-DC-Link), as many transmission CIDs (CIDs assigned for transmitting) as the number of direct communication links, and as many Confirmation Codes as the number of direct communication links. Confirmation Code of Table 2 is information indicating the acceptance or rejection of a link creation request, which is set to 0x00 if a terminal accepts a base station's link creation request and 0x01 if the terminal rejects the base station's link creation request.

According to the IEEE 802.16.1a standard, when creating a link for direct communication between two terminals, a base station transmits an AAI-DC-LC-REQ message to the two terminals in order to make a request to create a link between the two terminals, and the two terminals each transmit an AAI-DC-LC-RSP message in response to the request. The AAI-DC-LC-REQ message and/or AAI-DC-LC-RSP message may contain a combination of the FID of each terminal assigned to this link and an uplink/downlink indicator. If there are multiple links, the AAI-DC-LC-REQ message and/or AAI-DC-LC-RSP message may contain a combination of the FID of each terminal corresponding to each of the multiple links and an uplink/downlink indicator.

2. Link Identification Using Unique Link Identifier

A link can be identified by allocating a unique link identifier (parameter for link identification), rather than a device identifier, FID, or CID, to the link. Accordingly, a device may have a link identifier corresponding to each individual link or each link combination (consisting of multiple links). Herein, a multicast group may be formed via multiple links that a device has. A link identifier in accordance with an exemplary embodiment of the present invention has a different identification system from the above-described device identifier. A link identifier may correspond to either a single link or multiple links constituting a link group. Accordingly, the link identifier may correspond to the device identifier of a device forming the corresponding link. The link identifier may be unique in a group (e.g., a network, subnetwork, cell, or sector) to which the device belongs. In the case that devices can be distinguished by group, (e.g., a network, subnetwork, cell, or sector), different devices belonging to different groups may use the same link identifier. For example, if a first device and a second device within a first cell form a first link, and a third device and a fourth device within a second cell form a second link, the same link identifier (e.g., link identifier 1) may be allocated to the first link and the second link. Even if devices are distinguished by group (e.g., a network, subnetwork, cell, or sector), in the case that two devices forming a link belong to different groups, each of the devices forming the link has to use the same link identifier. For example, if a first device of a first cell and a second device of a second cell form a first link, the first device and the second device have to use the same link identifier (e.g., link identifier 1) for the first link.

In the case of link identification using the above-described link identifier, devices forming the link need to be distinguished. As described above, devices may use a link identifier to identify at least one link. To control at least one link or perform transmission over at least one link, device distinction is required. A device indicator may be used to distinguish devices forming a link corresponding to a link identifier. Specifically, a device may have a device indicator for each link identifier. Accordingly, a device indicator may be unique for a device forming links corresponding to the same link identifier. The device indicator may be repeatedly used for devices forming different links corresponding to different link identifiers. For example, if a first device and a second device form a first link, link identifier 1 is allocated for the first link, the second device and a fourth device form a second link, and link identifier 2 is allocated for the second link, the first device may be allocated with device indicator 1 for link identifier 1, the fourth device may be allocated with device indicator 1 for link identifier 2, and the second device may be allocated with device indicator 0 for both of link identifier 1 and link identifier 2. A combination of a link identifier and a device indicator may indicate at least one link and a device forming the at least one link. The device indicator may indicate either a transmitter or a receiver, and indicate a link direction. Specifically, assuming that the device indicator indicates a transmitter, it is deemed that a device (e.g., the first device) corresponding to a specific device indicator (e.g., device indicator 1) performs transmission, and an opposing device (e.g., the second device), with which the first device forms one of the links corresponding to the link identifier (e.g., link identifier 2) of the device indicator 1, performs reception. Thus, a link direction (from the first device to the second device) can be found. On the contrary, assuming that the device indicator indicates a receiver, it is deemed that a device (e.g., the third device) corresponding to a device indicator (e.g., device indicator 2) performs reception, and an opposing device (e.g., the fourth device), with which the third device forms one of the links corresponding to the link identifier (e.g., link identifier 3) of the device indicator 2, performs transmission. Thus, a link direction (from the fourth device to the third device) can be found.

Link identification information for identifying links may be configured as follows.

In the case that unique link identifiers are not used (e.g., before the allocation of unique link identifiers), link identification information may be configured as the device identifier of each device forming a link. Otherwise, link identification information may be configured as a specific identifier allocated to each device forming a link. For example, link identification information may be configured as a TWDC (two-way direct communication) address of the IEEE 802.16.1a standard, or a CID of the IEEE 802.16n standard. On the other hand, in the case that unique link identifiers are used, link identification information may be configured as a link identifier and a device indicator.

Link identification information may be either statically or dynamically allocated.

1. Static Allocation of Link Identification Information

A link identifier may be statically allocated to each link between a device (e.g., the first device) and every device with which the first device can communicate. The first device may have device information of devices forming each link and link identification information corresponding to each link, both of which are allocated for every link. The device information may contain a device indicator.

2. Dynamic Allocation of Link Identification Information

Link identification information may be dynamically allocated by a single device or multiple devices. Link identification information may be allocated at the time of creating a corresponding link. The allocated link identification information may be released by a single device or multiple devices when unlinking, at link disconnection, or when an event meeting a predetermined condition occurs. If a maintenance period/expiration date is assigned for link identification information, the allocated link identification information may be maintained during the maintenance period and then released (or maintained until the expiration date and then released). The maintenance period/expiration date may be updated (or modified) before the maintenance period expires or until the expiration date, and the maintenance period/expiration date also may be updated upon request. The maintenance period/expiration date of link identification information (hereinafter, maintenance period) may be specified in advance or at the time of allocation of link identification information. A specified value of the maintenance period may be changed (replaced or accumulated) with the change of the link identification information. The allocated link identification information may not be changed or released even if the link identification information is dynamically allocated. In this case, it is deemed that static allocation of the link identification information has been carried out. That is, dynamic allocation of link identification information can be carried out by static allocation, without changing and releasing the link identification information.

FIG. 1 is a flowchart showing a procedure of dynamically allocating link identification information between devices forming a link in accordance with an exemplary embodiment of the present invention. For convenience of explanation, FIG. 1 illustrates a procedure of allocating link identification information to identify a first link formed between a first device and a second device.

The first device sends a request for transmission of link identification information to a neighboring device in order to acquire previously allocated link identification information (that is, link identification information pre-allocated to the neighboring device) (S110).

Upon receiving the transmission request, the neighboring device transmits its allocated link identification information to the first device. The first device receives the link identification information pre-allocated to the neighboring device from the neighboring device (S120).

The first device may allocate, for a first link, a link identifier (link identifier 4) other than link identifiers (e.g., link identifier 1, link identifier 2, and link identifier 3) of the link identification information received from the neighboring device. Specifically, the first device sends a request for allocation of link identification information containing link identifier 4 to a second device, i.e., an opposing device with which it forms a first link (S130). Upon receiving the allocation request, the second device may accept or reject the received request for allocation of link identification information. The first device receives response information about the allocation of link identification information from the second device (S140). If the first device receives the acceptance of the request for allocation of link identification information from the second device, it determines that link identification information containing link identifier 4 has been successfully allocated.

If the first device intends to change or release the allocated link identification information, it may send a request to change or release the allocated link identification information to the second device. Upon receiving this request, the second device may accept or reject the request for change or release of link identification information. Then, if the first device receives the acceptance of the request for change or release of link identification information from the second device, it determines that link identification information has been successfully changed or released.

The link identification information may be allocated, changed, or released by a tenth device, other than the devices (e.g., the first and second devices) forming the first link. The tenth device may refer to a base station, a relay station functioning as a base station, or network equipment.

Figure 2:
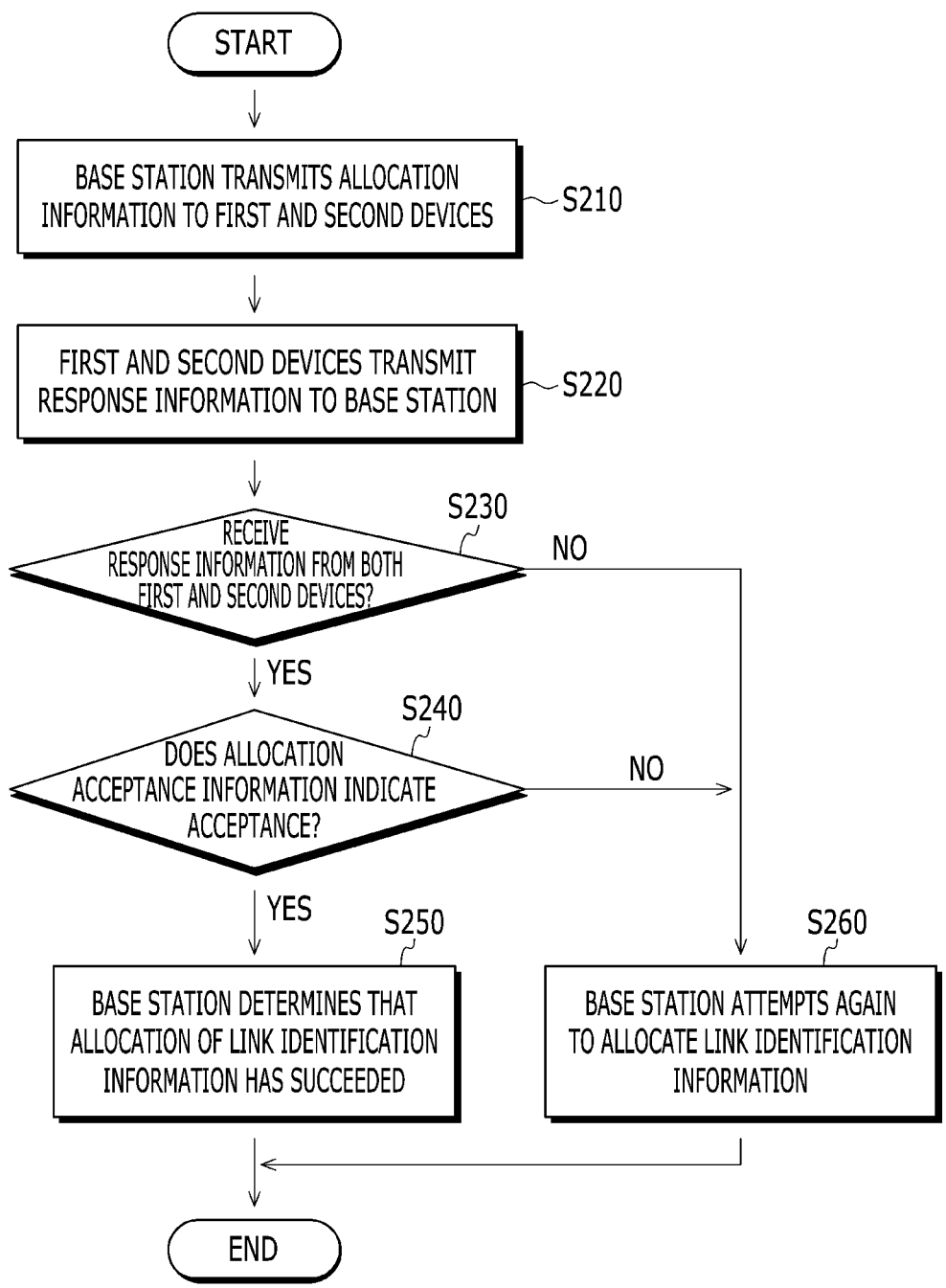
FIG. 2 is a flowchart showing a procedure of dynamically allocating link identification information by a tenth device (i.e., base station) in accordance with an exemplary embodiment of the present invention.

FIG. 2 is a flowchart showing a procedure of dynamically allocating link identification information by a tenth device in accordance with an exemplary embodiment of the present invention. For convenience of explanation, the tenth device refers to a base station, and FIG. 2 illustrates a procedure of allocating link identification information to identify a first link formed between a first device and a second device.

A base station transmits link identification information allocation information (hereinafter, allocation information) to first and second devices to which link identification information is to be allocated (S210). If link identification information is allocated at the time of link creation, the link identification information may be included in link creation-related information containing link creation request information. The allocation information may include link identification information, target link information (e.g., link information about the first link), and maintenance period information/expiration date information (hereinafter, maintenance period) of link identification information. The target link information may contain an FID, CID, FID combination, or CID combination, as set forth above. If the first device intends to create or has already formed a link with a device (e.g., the third device) other than the second device, the base station simultaneously transmits multiple different pieces of allocation information to the first device. In this case, the allocation information may include the number (e.g., two) of allocations of link identification information, as many pieces of link identification information as the number of allocations of link identification information, as many pieces of target link identification information as the number of allocations of link identification information, and as many pieces of maintenance period information as the number of allocations of link identification information.

The devices (e.g., the first and second devices) which receive link identification information receive allocation information from the base station. After receiving allocation information, the first device and the second device may use the received target link information and link identification information for a target link (i.e., first link). The first device and the second device transmit link identification information allocation response information (hereinafter, allocation response information) to the base station, in response to receipt of the allocation information (S220). If a response about the allocation of link identification information is given together with a link creation response, allocation response information may be included in link creation-related information containing link allocation response information. The allocation response information may include target link information (e.g., link information about the first link), allocation acceptance information indicating the acceptance or rejection of allocation of link identification information, and maintenance period information. If the first device intends to create or has already formed a link with a device (e.g., the third device) other than the second device, the first device may simultaneously transmit multiple difference pieces of allocation response information to the base station. In this case, the allocation response information may include the number of responses about the allocation of link identification information (hereinafter, number of allocation responses), as many pieces of target link information as the number of allocation responses, as many pieces of allocation acceptance information as the number of allocation responses, and as many pieces of maintenance period information as the number of allocation responses. If the first device gives a response about the allocation of link identification information, together with a link creation response, the number of allocation responses may be replaced with the number of link creation responses.

If a device (e.g., the first device or second device) which has received allocation information accepts the allocation of received link identification information, it sets the allocation acceptance information to indicate acceptance. If the device rejects the allocation of received link identification information, it sets the allocation acceptance information to indicate rejection. If a device (e.g., the first device or second device) which has received allocation information sets the allocation acceptance information as acceptance, it may include maintenance period information in the allocation response information. If received link identification information (e.g. link identifier 1) is already used for another link (e.g., second link formed between the first device and a fourth device), the device (e.g., the first device) which has received allocation information may reject the allocation of received link identification information. A device which has set the allocation acceptance information as rejection does not use the received link identification information for the corresponding link (e.g., the first link). A device (e.g., the first device) which has set the allocation acceptance information as rejection may include expected time information in the allocation response information to make an allocation re-attempt. By doing so, the first device may induce the base station to attempt to allocate link identification information after the expected time. If a device (e.g., the first device or second device) which has received allocation information cannot form the corresponding link (e.g., the first link), it may reject the allocation of received link identification information.

The base station receives allocation response information from the first and second devices. If the base station receives allocation response information regarding a piece of link identification information (e.g., link identifier 1 for identifying a first link) transmitted by the base station from both of the first and second devices (S230), and allocation acceptance information in the received allocation response information indicates acceptance (S240), it is determined that the allocation of the corresponding link identification information (e.g., link identifier 1 for identifying the first link) has succeeded (S250). On the other hand, if the base station does not receive allocation response information regarding a piece of link identification information transmitted by the base station from the first and second devices (S230), or allocation acceptance information in, if any, received allocation response information indicates rejection, the base station makes a re-attempt to allocate a different piece of link identification information (e.g., link identifier 2) to the first and second devices (S260).

Figure 3:
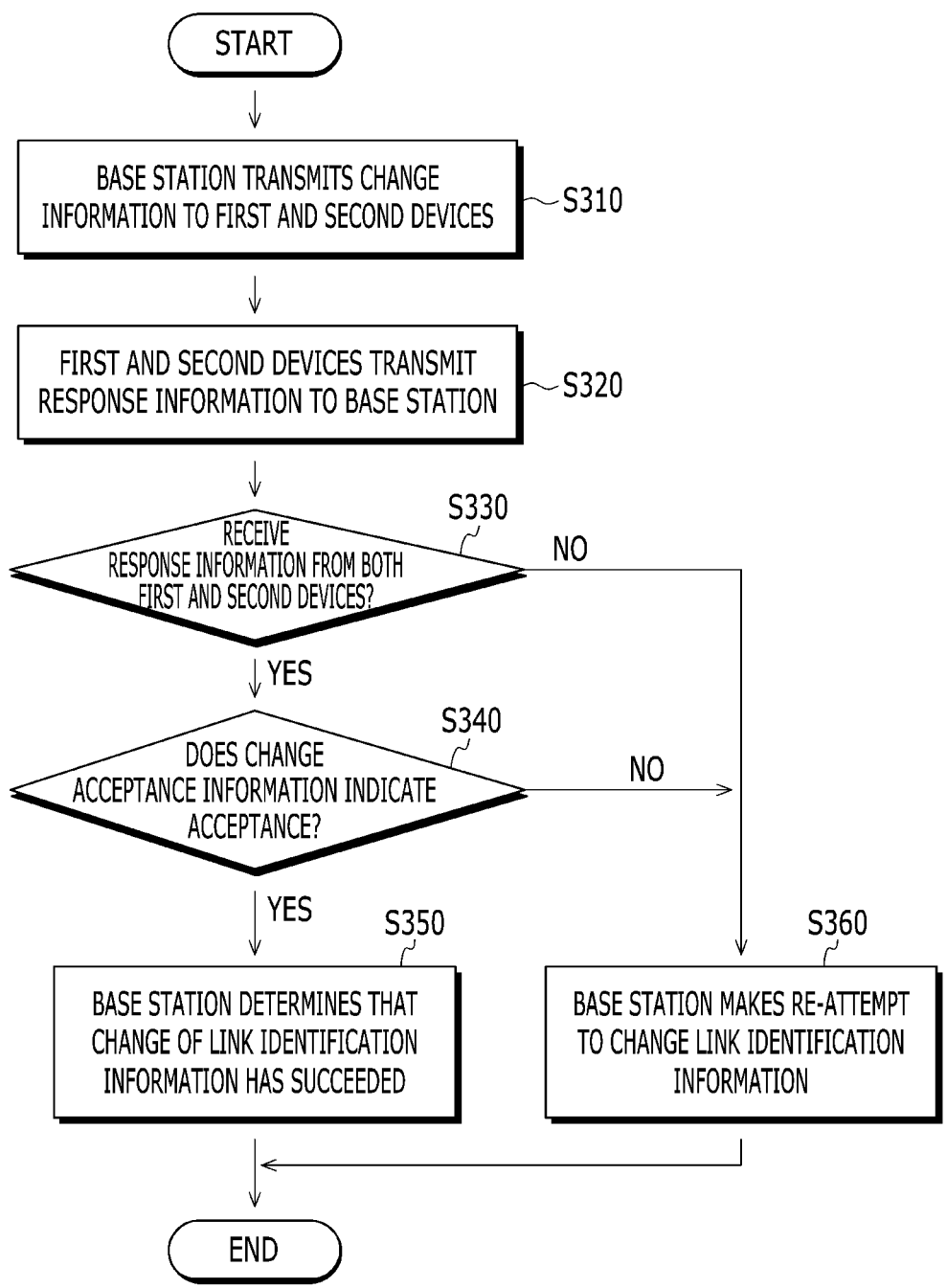
FIG. 3 is a flowchart showing a procedure of dynamically changing link identification information by a tenth device in accordance with an exemplary embodiment of the present invention.

FIG. 3 is a flowchart showing a procedure of dynamically changing link identification information by a tenth device in accordance with an exemplary embodiment of the present invention. For convenience of explanation, the tenth device refers to a base station, and FIG. 3 illustrates a procedure of allocating link identification information allocated for a first link formed between a first device and a second device.

A base station transmits link identification information change information (hereinafter, change information) to first and second devices to which link identification information (e.g., link identifier 1 for identifying a first link) is allocated (S310). The change information may include pre-change link identification information (e.g., link identifier 1), post-change link identification information (e.g., link identifier 2), and target link information (e.g., link information about the first link). If the change information is maintenance period information, the change information may further include post-change maintenance period information. If the first device has formed a link with a device (e.g., the third device) other than the second device, the base station may simultaneously transmit multiple different pieces of change information to the first device. In this case, the change information may include the number (e.g., two) of changes of link identification information, as many pieces of pre-change link identification information as the number of changes of link identification information, as many pieces of post-change link identification information as the number of changes of link identification information, and as many pieces of target link identification information as the number of changes of link identification information. If the change information is maintenance period information, the change information may further include as many pieces of post-change maintenance period information as the number of changes of link identification.

The first and second devices receive change information from the base station. A device (e.g., the first device or second device) which has received change information may change the link identification information of the corresponding link (e.g., the first link) (from link identifier 1 to link identifier 2) by using the pre-change link identification (e.g., link identifier 1), post-change link identification information (e.g., link identifier 2), and target link information (e.g., link information about the first link). Also, a device (e.g., the first device or second device) which has received change information may change (replace or accumulate) the maintenance period information of the corresponding link (e.g., the first link) by using the pre-change link identification (e.g., link identifier 1), target link information (e.g., link information about the first link), and post-change maintenance period information.

A device (e.g. the first device or second device) which has received change information transmits link identification information change response information (hereinafter, change response information) to the base station, in response to receipt of the change information (S320). If a response about the change of link identification information is given together with a link change response, change response information may be included in link change-related information containing link change response information. The change response information may include target link information (e.g., link information about the first link), pre-change link identification information (e.g., link identifier 1), post-change link identification information (e.g., link identifier 2), and change acceptance information indicating the acceptance or rejection of change of link identification information. If the first device has formed a link with a device (e.g., the third device) other than the second device, the first device may simultaneously transmit multiple difference pieces of change response information to the base station. In this case, the change response information may include the number of responses about the change of link identification information (hereinafter, number of change responses), as many pieces of target link information as the number of change responses, as many pieces of pre-change link identification information as the number of change responses, as many pieces of post-change link identification information as the number of change responses, and as many pieces of change acceptance information as the number of change responses.

If received link identification information (e.g. link identifier 2) is already used for another link (e.g., the second link formed between the first device and a fourth device), the device (e.g., the first device) which has received change information may reject the change of received link identification information. If a device (e.g., the first device or second device) which has received change information rejects the change of received link identification information, change link identification information (e.g., a link identifier) or maintenance period information is not changed.

The base station receives change response information from the first and second devices. If the base station receives change response information regarding a piece of change information transmitted by the base station from both of the first and second devices (S330), and change acceptance information in received change response information indicates acceptance (S340), it is determined that the change of corresponding link identification information (e.g., from link identifier 1 to link identifier 2) or the change of maintenance period information (e.g., from a first period to a second period) has succeeded (S350). On the other hand, if the base station does not receive change response information regarding a piece of change information transmitted by the base station from the first and second devices (S330), or change acceptance information in, if any, received change response information indicates rejection (S340), the base station may make a re-attempt to change the link identification information to a different piece of link identification information (e.g., link identifier 3) for the first and second devices. Likewise, if the base station does not succeed in changing maintenance period information, it may make a re-attempt to change the maintenance period information for the first and second devices.

Figure 4:
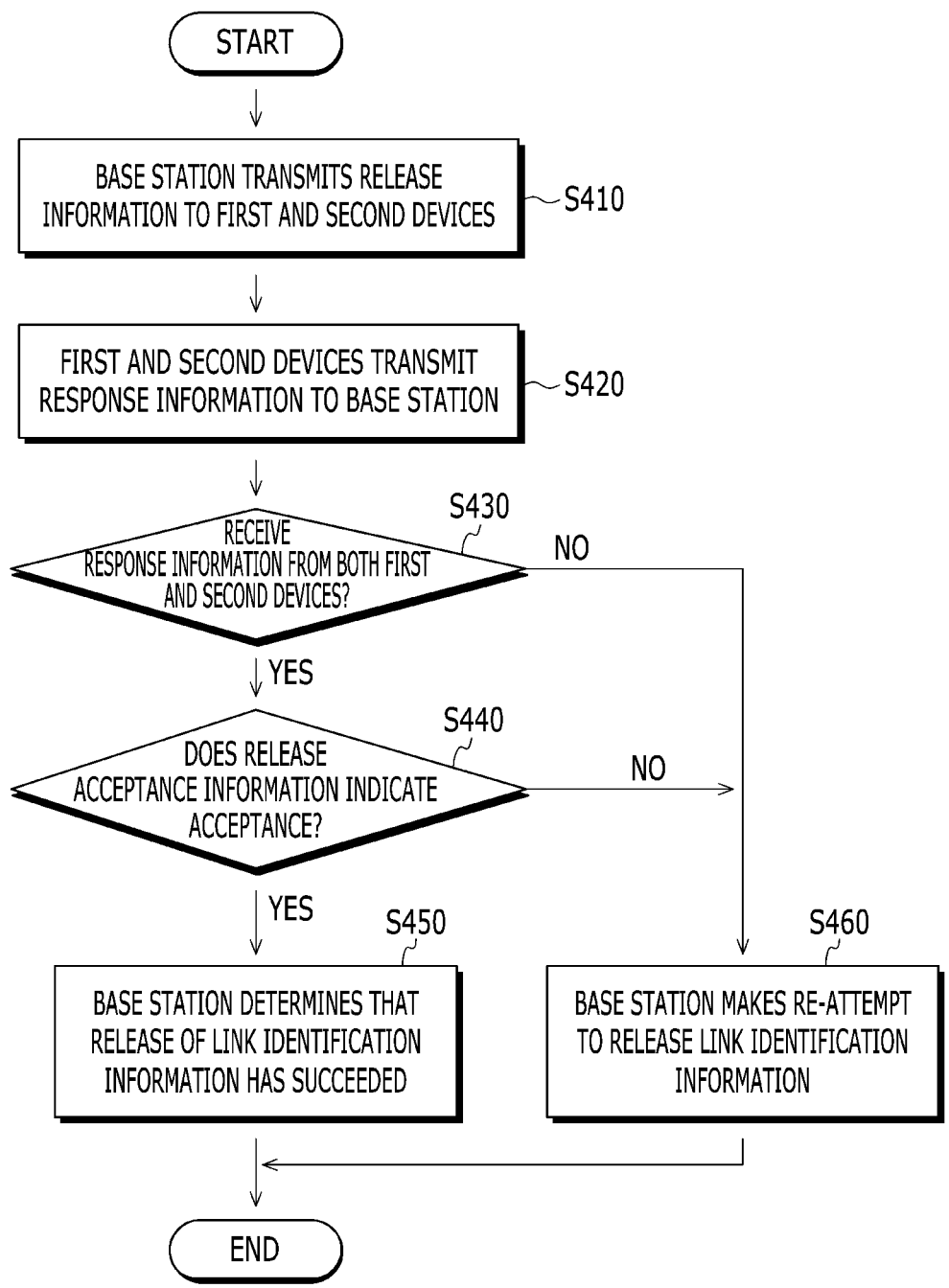
FIG. 4 is a flowchart showing a procedure of dynamically releasing link identification information by a tenth device in accordance with an exemplary embodiment of the present invention.

FIG. 4 is a flowchart showing a procedure of dynamically releasing link identification information by a tenth device in accordance with an exemplary embodiment of the present invention. For convenience of explanation, the tenth device refers to a base station, and FIG. 4 illustrates a procedure of allocating link identification information allocated for a first link formed between a first device and a second device.

The base station transmits link identification information release information (hereinafter, release information) to the first and second devices to release the link identification information (e.g., link identifier 1) allocated to the first and second devices (S410). If link identification information is released together with the release of a link, release information may be included in link release-related information containing link release request information. The release information may include release target link identification information (e.g., link identifier 1) and target link information (e.g., link information about a first link). If the first device has formed a link with a device (e.g., the third device) other than the second device, the first device may simultaneously transmit multiple difference pieces of release information to the base station. In this case, the release information may include the number of releases of link identification information, as many pieces of release target link identification information as the number of releases of link identification information, and as many pieces of target link information as the number of releases of link identification information.

The first and second devices receive release information from the base station. A device (e.g., the first device or second device) which has received release information may release the link identification information (e.g., link identifier 1) of the corresponding link (e.g., the first link). A device (e.g., the first device or second device) which has received release information transmits link identification information release response information (hereinafter, release response information) to the base station, in response to receipt of the release information (S420). If a response about the release of link identification information is given together with a link release response, release response information may be included in link release-related information containing link release response information. The release response information may include target link information (e.g., link information about the first link), release target link identification information (e.g., link identifier 1), and release acceptance information indicating the acceptance or rejection of release of link identification information. If the first device has formed a link with a device (e.g., the third device) other than the second device, the first device may simultaneously transmit multiple difference pieces of release response information to the base station. In this case, the release response information may include the number of responses about the release of link identification information (hereinafter, number of release responses), as many pieces of target link information as the number of release responses, as many pieces of release target link identification information as the number of release responses, and as many pieces of release acceptance information as the number of release responses. If the first device gives a response about the release of link identification information, together with a link release response, the number of release responses may be replaced with the number of link release responses.

If a device (e.g., the first device or second device) which has received release information accepts the release of received link identification information, it sets the release acceptance information to indicate acceptance. If the device rejects the release of received link identification information, it sets the release acceptance information to indicate rejection. A device which rejects the release of received link identification information does not release the link identification information for the corresponding link (e.g., the first link).

The base station receives release response information from the first and second devices. If the base station receives release response information regarding a piece of release information transmitted by the base station from both of the first and second devices (S430), and release acceptance information in the received release response information indicates acceptance (S440), it is determined that the release of corresponding link identification information (e.g., link identifier 1 for the first link) has succeeded (S450). On the other hand, if the base station does not receive release response information regarding a piece of release information transmitted by the base station from the first and second devices (S430), or release acceptance information in, if any, received release response information indicates rejection (S440), the base station may make a re-attempt to release the link identification information for the first and second devices (S460).

Link identification information may be released together with the release of a link by the base station.

The base station may determine whether a link is released or not, based on status information of the link corresponding to link identification information. The base station may receive the status information of a link (e.g., the first link) corresponding to link identification information (e.g., link identifier 1) from devices (e.g., the first device and second device) forming the corresponding link (e.g., the first link). Devices (e.g., the first and second devices) forming a link (e.g., the first link) corresponding to specific link identification information (e.g., link identifier 1) may transmit status information of the corresponding link (e.g., the first link) to the base station. The status information of the link may include information about whether it is possible to transmit/receive over the corresponding link, and channel status information and channel quality information of the corresponding link.

If two devices (e.g., the first and second devices) forming a link are controlled by different base stations, information for the allocation, change, or release of link identification information may be transmitted to the respective devices by the different base stations. For example, if a first device of a first cell and a second device of a second cell form a first link, which is a direct communication link, the first device is controlled by a first base station of the first cell, and the second device is controlled by a second base station of the second cell. As such, the first base station transmits allocation information, change information, or release information to the first device, and the second base station transmits allocation information, change information, or release information to the second device. The different base stations (e.g., the first and second base stations) may exchange link identification information and maintenance period information of links controlled by them, in order to achieve the integrity of link identification information. Also, the different base stations (e.g., the first and second base stations) may exchange allocation response information, change response information, or release response information received from devices (e.g., the first and second devices) corresponding to link identification information.

The different base stations (e.g., the first and second base stations) may be controlled by an eleventh device, in order to achieve the integrity of link identification information. The eleventh device is a device to which different base stations (e.g., the first and second base stations) belong (or are attached), which may be network equipment. The different base stations each may transmit link identification information and maintenance period information of links controlled by them to the eleventh device. Also, the different base stations (e.g., the first and second base stations) may each transmit allocation response information, change response information, or release response information received from the devices (e.g., first and second devices) corresponding to the link identification information to the eleventh device. Also, the eleventh device may receive the allocation response information, change response information, or release response information from the different base stations (e.g., the first and second base stations), and control and manage the link identification information and the maintenance period information based on the received information.

Allocation, change, or release target link information may include the device indicator of a device forming a corresponding link, the IP address of the device forming the corresponding link, the FID of the corresponding link, or the CID of the corresponding link. For communication, not via a direct communication link, but via a cellular link, link information may further include an uplink/downlink indicator, a transmit/receive indicator indicative of a transmission/reception target, or reference signal information of an opposing device forming the corresponding link. In the case that there are multiple FIDs (or FID combinations, CIDs, or CID combinations) because the first device forms links with multiple devices, link information about each link may include one FID (or FID combination, CID, or CID combination) corresponding to this link. The reference signal information of the opposing device may include ranging transmission information (or discovery transmission information). The ranging transmission information may include opportunity for ranging signal transmission, ranging signal transmission resource information, a ranging signal code index, or a ranging signal transmission cycle.

The maintenance period information may refer to a period expressed in time (or time unit) or an expiration time expressed in time (or time unit). The time unit may denote a slot index (or slot number), a symbol index (or symbol number), a subframe index (or subframe number), a frame index (or frame number), or a superframe index (or superframe number). The period expressed in time unit may denote a frame duration expressed by a frame index. The expiration time expressed in time unit may denote the LSB (least significant bit) of the frame index.

Information for the allocation, change, or release of link identification information (i.e., allocation information, change information, release information, allocation response information, change response information, and release response information) may be transmitted via a message, a MAC header, or a control channel.

In IEEE 802.16.1a, an AAI-DC-LC-REQ control message is transmitted to create a direct communication link. The AAI-DC-LC-REQ message may contain, as link identification information, a link identifier (e.g., DCLID (direct communication link ID)) and a device indicator (hereinafter, link identifier combination). Moreover, the AAI-DC-LC-REQ message may contain, as link identification information, a combination of a TWDC address for transmission and a TWDC address for reception (hereinafter, TWDC address combination). In addition, the AAI-DC-LC-REQ message may contain an FID combination as link information of a link to be allocated (created). The AAI-DC-LC-REQ message may contain the number of allocations of link identification information (or the number of created links) and as many link identifier combinations as the number of allocations of link identification information, to support the creation of multiple links. Moreover, the AAI-DC-LC-REQ message may contain the number of allocations of link identification information and as many TWDC address combinations as the number of allocations of link identification information, to support the creation of multiple links. In addition, the AAI-DC-LC-REQ message may contain the number of allocations of link identification information and as many FID combinations as the number of allocations of link identification information, to support the creation of multiple links.

The AAI-DC-LC-REQ message and the AAI-DC-LC-RSP message may have the formats as shown in the following Tables 3 and 4.

TABLE 3

Format of AAI-DC-LC-REQ Message

| Syntax | Size (bits) | A first note | A second note |
|---|---|---|---|
| for (i=0; i< N-DC-LINK; i++){ | | N-DC-Link is the number of DC links, and ranges from 1 to 4. | |
| TWDC address for transmitting | 12 | Address assigned for DC link | mandatory |
| TWDC address for receiving | 12 | Address assigned for DC link | mandatory |
| } | | | |

TABLE 4

Format of AAI-DC-LC-RSP Message

| Syntax | Size (bits) | A first note | A second note |
|---|---|---|---|
| for (i=0; i< N-DC-LINK; i++){ | | | |
| TWDC address for transmitting | 12 | | mandatory |
| Confirmation Code | 1 | 0b0: Accept 0b1: Reject | mandatory |
| } | | | |

As shown in Table 3, the AAI-DC-LC-REQ message may contain as many TWDC transmission addresses (TWDC addresses assigned to links for transmission) as the number of direct communication links (N-DC-Link) and as many TWDC reception addresses (TWDC addresses assigned to links for reception) as the number of direct communication links.

As shown in Table 4, the AAI-DC-LC-RSP message may contain as many TWDC transmission addresses as the number of direct communication links (N-DC-Link) and as many Confirmation Codes as the number of direct communication links. Confirmation Code of Table 4 is information indicating the acceptance or rejection of a link creation request, which is set to 0b0 if a terminal accepts a base station's link creation request and 0b1 if the terminal rejects the base station's link creation request.

Allocated link identification information may be included in control information or data when transmitting the control information or data for communication. The control information may be transmitted via a control message, MAC header, or control channel. The control message may be a MAC control message or control message of the IEEE 802.16.1a standard. The MAC header may be a MAC signaling header or extend header of the IEEE 802.16.1 standard. The control channel may be a DC assignment A-MAP IE used for data transmission control in IEEE 802.16.1a. The DC assignment A-MAP IE is a control channel that includes a resource allocation area related to direct communication between terminals, MCS level, MIMO control information, etc.

Allocated link identification information may be included in control information by performing an operation between the allocated link identification information and a specific part of control information. Alternatively, allocated link identification information, as a part of control information, may be included in the control information. Here, a specific part of control information may be a type of information that is used to determine whether the transmission of control information has succeeded or not. Specifically, a specific part of the control information may be a CRC (cyclic redundancy check) code used for error detection. That is, a value obtained by performing an XOR operation between allocated link identification information and a CRC code may be included in the control information. Meanwhile, the CRC code of the DC assignment A-MAP IE in IEEE 802.16.1a may be masked by a link identifier, and a device indicator may be included in the value of any one field of the DC assignment A-MAP IE. If a TWDC address combination is used as link identification information in the IEEE 802.16.1a standard, the CRC code of DC assignment A-MAP IE may be masked by a TWDC address for HR-MS transmission.

When transmitting control information or data, a device (e.g., the first device) forming a link may include allocated link identification information in the control information or data. Upon receiving control information or data, a device (e.g., the first device) forming a link may determine whether the received control information or data is related to its link (e.g., the first link), based on link identification information. Moreover, if a device (e.g., the first device) forms links with multiple devices, the device (e.g., the first device) may determine, upon receiving control information or data, which one of the multiple links the received control information or data is related to, based on link identification information. Upon receiving control information or data, a device (e.g., the first device) forming a link may determine a link direction (e.g., transmission or reception) of its link (e.g., the first link), based on link identification information.

Figure 5:
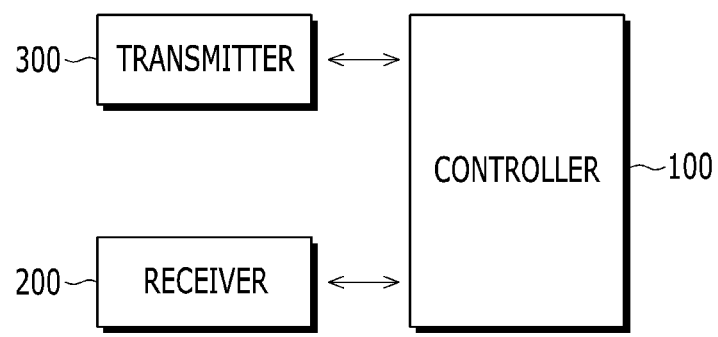
FIG. 5 is a view showing the configuration of a communication apparatus in accordance with an exemplary embodiment of the present invention.

FIG. 5 is a view showing the configuration of a communication apparatus in accordance with an exemplary embodiment of the present invention.

A communication apparatus (e.g., a terminal, base station, or relay station) includes a transmitter 300, a receiver 200, and a controller 100.

The transmitter 300 transmits information for the allocation, change, and release of the above-described control information, data, or link identification information (i.e., allocation information, change information, release information, allocation response information, change response information, and release response information).

The receiver 200 receives information for the allocation, change, and release of the above-described control information, data, or link identification information (i.e., allocation information, change information, release information, allocation response information, change response information, and release response information).

The controller 100 controls reception by the transmitter 300 and reception by the receiver 200. Specifically, the controller 100 performs control functions related to the allocation, change, or release of the above-described link identification information. The controller 100 is in charge of a MAC function.

According to an embodiment of the present invention, even if there are multiple communication links, each of the communication links can be identified effectively.

Furthermore, according to an embodiment of the present invention, privacy and security problems can be avoided because a unique link identifier, rather than a terminal identifier, is used.

In addition, according to an exemplary embodiment of the present invention, overhead caused by link identification information can be minimized because a large number of links can be identified with as small an amount of link identification information as possible.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method for a third device that controls a first link established directly between a first device and a second device, the communication method comprising:
   allocating a first link identifier for identifying the first link;
   transmitting first information including the first link identifier to the first device and the second device;
   receiving, from the first device and the second device, second information including allocation acceptance information indicating acceptance or rejection of allocation of the first link identifier;
   transmitting, to the first device and the second device, third information to change a first period during which the first link identifier is used, the third information including a second period to which the first period is changed; and
   receiving, from the first device and the second device, fourth information including change acceptance information indicating acceptance or rejection of the change of the first period,
   wherein when the second information includes the allocation acceptance information indicating the rejection of the allocation of the first link identifier, the second information further includes expected time information for reattempting an allocation.

2. The communication method of claim 1, wherein the third device is either a base station or relay station.

3. The communication method of claim 2, wherein the transmitting of first information comprises including, in the first information, a first device indicator for identifying the first device allocated for the first link and a second device indicator for identifying the second device allocated for the first link.

4. The communication method of claim 1, further comprising:
   when the second information is not received, or when the allocation acceptance information of the second information indicates the rejection of allocation of the first link identifier, allocating a second link identifier for identifying the first link; and
   when the second link identifier is allocated, transmitting third information including the second link identifier to the first device and the second device.

5. The communication method of claim 1, further comprising transmitting, to the first device and the second device, fifth information to release the allocated first link identifier.

6. The communication method of claim 5, wherein the transmitting of the fifth information comprises including the first link identifier in the fifth information.

7. The communication method of claim 6, further comprising receiving, from the first device and the second device, sixth information including release acceptance information indicating acceptance or rejection of release of the first link identifier.

8. A communication method of a second terminal that forms a first link for direct communication with a first terminal, the communication method comprising:
   receiving, from a base station, first information including a first link identifier allocated by the base station, the first link identifier being a link identifier for identifying the first link; and
   transmitting, to the base station, second information including allocation acceptance information indicating acceptance or rejection of allocation of the first link identifier;
   receiving, from the base station, third information to change a first period during which the first link identifier is used, the third information including a second period to which the first period is changed; and
   transmitting, to the base station, fourth information including change acceptance information indicating acceptance or rejection of the change of the first period,
   wherein when the second information includes the allocation acceptance information indicating the rejection of the allocation of the first link identifier, the second information further includes expected time information for reattempting an allocation.

9. The communication method of claim 8, wherein
   the transmitting of second information comprises:
   when the allocation of the first link identifier is accepted, setting the allocation acceptance information to indicate acceptance; and
   when the allocation of the first link identifier is rejected, setting the allocation acceptance information to indicate rejection.

10. A method for a first terminal to identify a first link formed directly between the first terminal and a second terminal, the method comprising:

sending, to at least one third terminal neighboring the first terminal, a request for the transmission of at least one first link identifier allocated to the third terminal;

receiving the first link identifier from the third terminal;

allocating a second link identifier, different from the first link identifier, to identify the first link;

transmitting first information including the second link identifier to the second terminal;

receiving, from the second terminal, second information including allocation acceptance information indicating acceptance or rejection of allocation of the second link identifier; and transmitting, to the second terminal, third information to change a period during which the second link identifier is used from a first period to a second period, wherein none of the first, second and third terminals are a base station, and wherein when the second information includes the allocation acceptance information indicating the rejection of the allocation of the second link identifier, the second information further includes expected time information for reattempting an allocation.

11. The link identification method of claim 10, wherein the transmitting of first information comprises including, in the first information, a first device indicator for identifying the first terminal allocated for the first link and a second device indicator for identifying the second terminal allocated for the first link.

12. A communication method for a base station that controls N communication links formed directly between a first terminal and N (N is a natural number of 2 or more) second terminals, the communication method comprising:

transmitting, to the first terminal, a first message containing a plurality of link identifiers for identifying the N communication links, the plurality of link identifiers including
N first link identifiers for transmission, and
N second link identifiers, each corresponding to one of the first link identifiers, for reception; and receiving, from the first terminal, a second message containing the N first link identifiers and N pieces of link creation acceptance information indicating acceptance or rejection of a request to create the N communication links.

13. The communication method of claim 12, wherein the transmitting comprises transmitting the first message to the first terminal when sending a request to create the N communication links.

14. The communication method of claim 12, wherein
each of the N first link identifiers is a TWDC (two-way direct communication) address for transmission, and
each of the N second link identifiers is a TWDC address for reception.

15. The communication method of claim 12, wherein
each of the N first link identifiers is a CID (connection identifier) assigned for transmission, and
each of the N second link identifiers is a CID assigned for reception.

16. The communication method of claim 12, wherein the second message further includes expected time information for reattempting an allocation, when at least one of the N pieces of link creation acceptance information indicates the rejection of the request to create at least one of the N communication links.

* * * * *